United States Patent Office 3,137,316
Patented June 16, 1964

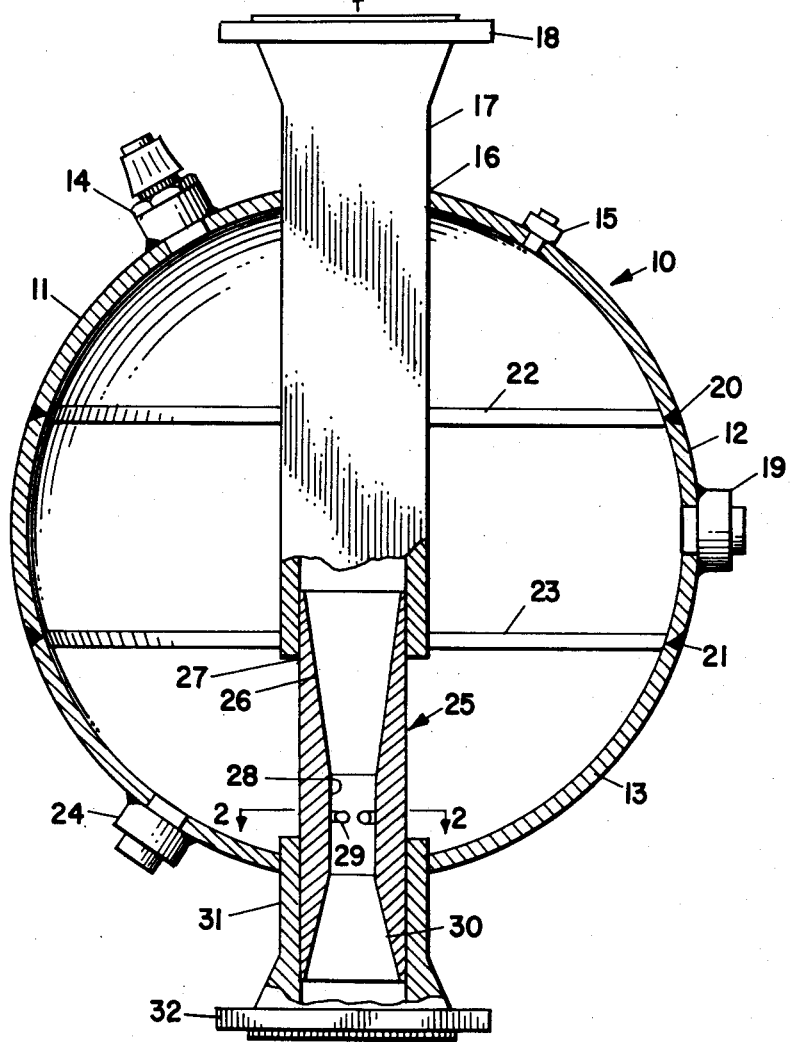
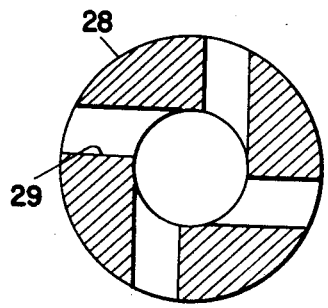
FIG.2.
FIG.1.
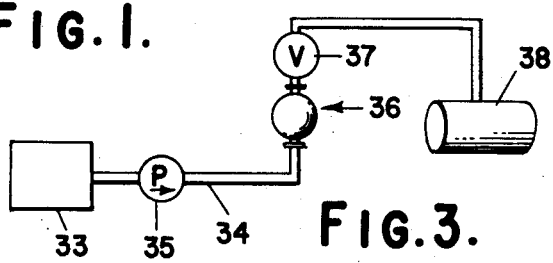
FIG.3.
INVENTORS
WILHELM S. EVERETT
JOHN F. RICHARDS
BY Elliott & Pastoriza
ATTORNEYS

3,137,316
FLUID PULSATION DAMPENER
Wilhelm S. Everett, 126 W. Santa Barbara St., and John F. Richards, 1219 Hawthorne St., both of Santa Paula, Calif.
Continuation of application Ser. No. 195,624, May 17, 1962. This application Jan. 13, 1964, Ser. No. 338,560
16 Claims. (Cl. 138—26)

This invention generally relates to fluid pulsation dampeners for the control of fluid surges and pulsations, and it more particularly concerns a dampener designed for diversified applications to meet the requirements of various pressure surge limits, for example, as may characterize low pressure residential water lines or high pressure jet fluid lines.

The fluid surge dampener of the present invention will be described from the standpoint of its application to a tank filling line, although it will be appreciated that the dampener may equally well be applied to other analogous applications in which a sudden fluid surge or pressure is built up in a fluid line as the result of a valve closure or the like. Thus, the fluid surge dampener of the present invention may also be termed a device for the suppression of water hammer, for example.

Most conventional fluid surge dampening devices embody some type of moving part or parts which are subject to fatigue or failure. Others involve synthetic products which may deteriorate upon contact with certain fluids passing through the line. Still other dampening devices available on the market are of too large a size to meet the needs of many applications or are not subject to precise engineering design to match the surges and fluid viscosities characterizing the lines to which they are to be applied.

It is, therefore, an important object of the present invention to provide an improved fluid surge and pulsation dampener which is not subject to fatigue or wear and which will not require any appreciable maintenance over a long period of life.

Another object of the present invention is to provide a fluid surge dampener which does not require or embody any synthetic materials or other materials which may deteriorate by contact with various fluids, such as gasoline, oil, or the like which may be flowing through the line to which the dampener is coupled.

Still another object of the present invention is to provide a fluid surge dampener which may be constructed of relatively small overall dimensions, and yet which may be precisely sized and design calculated to match the fluid and range of surges anticipated in the line to which it is to be connected.

Still a further object of the present invention is to provide a fluid surge dampener which may be economically constructed of a minimum number of parts, and yet which may be conveniently fabricated on a production line basis.

These and other objects and advantages of the present invention are generally achieved by providing a fluid surge dampener designed for connection into a fluid line for dampening surges therein. The surge dampening portion of the device comprises a closed receptacle encircling and sealably connected to the line at two spaced points along the length thereof. A normally closed valve communicates between the interior of the receptacle and an external source of gas or air. The valve is of such a construction that it is designed to open in response to a given pressure drop within the receptacle.

A venturi section is interposed in the line, and the venturi section defines a throat portion having at least one opening therein communicating with the interior of the receptacle.

With such a construction for a fluid pulsation dampener, upon closure of a valve downstream of the device, the fluid flowing through the line will pass through the opening in the throat section of the venturi section into the receptacle and gradually fill the receptacle compressing the gas disposed therein (as hereafter explained); thereafter, the fluid will return to the line by passing out of the receptacle and back into the venturi section dissipating a part of its energy as it flows through the opening in the throat portion of the venturi section. In this regard, as a feature of the present invention, it is desirable that the opening be tangential to the throat portion such that a vortex action is created which tends to dissipate a substantial amount of the pressure energy of the fluid as it returns to the line.

During normal operation, the velocity of the fluid flowing through the venturi section causes a pressure drop at the venturi throat which in turn draws a certain volume of the fluid contained within the receptacle outwardly therefrom to in turn create a low pressure condition therein and, consequently, open the valve to allow gas to enter the receptacle whereby the receptacle is charged with gas in the event of valve closure as heretofore described.

A better understanding of the present invention will be had by reference to the drawings, showing merely one illustrative embodiment, and in which:

FIGURE 1 is a partial sectional view through the improvied fluid surge dampener of the present invention;

FIGURE 2 is a cross-sectional view of the venturi throat taken in the direction of the arrows 2—2 of FIGURE 1; and, FIGURE 3 is a schematic representation of a typical installation of the improved fluid surge dampener of the present invention.

Referring now to the drawings, there is shown in FIGURE 1 a shell 10 which forms a fluid vessel or receptacle. The shell 10 may be manufactured to include an upper portion 11, an intermediate portion 12, and a lower portion 13. The upper portion 11 is provided with a valve or vacuum breaker 14, which is designed to open in response to a given decrease of pressure within the shell 10. The upper portion 11 may also be provided with a pressure gauge 15 merely for visual indication of the interior pressure of the device.

The shell 10 in its upper section 11 is additionally provided with an opening 16 to receive an outlet line or pipe 17 which may embody at its external end a flange 18 for coupling to the downstream part of the line. The intermediate portion 12 is desirably provided with an inspection plug 19 such that the interior of the shell 10 when fabricated may still be visually examined.

The upper portion 11 may be welded as at 20 to the intermediate portion 12. Similarly, the intermediate portion 12 may be welded to the lower portion as indicated at 21. Preferably, backing rings 22 and 23 are provided within the shell 10 to reinforce the shell at the circular points underlying the welds 20 and 21. It will be appreciated that the particular construction employed to form the spherical receptacle may be varied and that the construction illustrated is merely one method of manufacturing the shell 10. Also, although a spherical construction is desired, other shapes may be employed for the shell 10 without materially affecting the operating results of the unit.

The bottom portion 13 desirably includes a drain plug 24 of conventional construction. It would also be noted that the vacuum breaker 14, the pressure gauge 15, and the inspection plug 19 are conventional devices available on the market, and it is not believed that their further description or explanation of operation is required or warranted.

In accordance with an important feature of the present invention, there is provided a venturi section 25 which includes a diverging upper portion 26 which may be welded at 27 to the lower end of the outlet pipe 17. The venturi section includes a throat portion 28 provided with at least one opening 29 communicating with the interior of the receptacle 10.

As shown more clearly in the view of FIGURE 2, it is preferred that four radially spaced openings be provided. It is also preferred that these openings 29 communicate tangentially with the interior of the throat section for a purpose that will become clearer as the description proceeds.

The venturi section 25 further includes a conventional converging section 30 which is rigidly coupled within an inlet pipe 31. The inlet pipe 31 may, in turn, be provided with a flange 32 (similar to the flange 18 of the outlet pipe 17) for coupling to the downstream part of the line.

The operation of the improved fluid surge dampener and the advantages of its construction may more clearly be appreciated by describing the unit as it might be installed in a conventional application. Thus, referring to FIGURE 3, there is schematically illustrated a tank 33 which may have an outlet connecting with a line 34. Interposed in the line 34 is a pump 35 which pumps fluid through an improved fluid surge dampening apparatus according to the present invention, indicated by the numeral 36. Downstream of the fluid surge dampener 36 is a valve 37 which controls the flow of fluid into the tank 38.

As will be noted, the improved fluid surge dampener 36, according to the present invention, is desirably mounted in a vertical position such that gravity will tend to draw all the fluid in the shell 10 down to the bottom of the lower shell portion 13 to the tangentially directed openings 29 communicating with the interior of the throat section 28.

In normal operation, fluid passes through the throat section 28 of the venturi section 25. Such increase in velocity will create a low pressure area in the throat section 28 in accordance with the well known theory of a venturi. The low pressure area will in turn be communicated to the interior of the receptacle 10 and tend to draw fluid outwardly therefrom through the openings 29 into the line 34. Such low pressure will also effect an opening of the vacuum breaker 14 to draw air into the interior of the shell according to the particular low pressure conditions determined by the velocity of the fluid flowing through the section 28, the volume of the shell, and other factors.

In some instances, it may be desirable to have the vacuum breaker 14 communicate with a particular source of gas instead of with atmosphere whereby the gas being drawn into the receptacle 10 will not be absorbed into or react with the fluid being pumped through the line 34. In such event, the valve 14 would be disposed in a line commuicating with another vessel containing a particular source of gas; however, most fluids are adaptable to the use of air and the valve 14 is shown in such application.

Thus, with the normal flow of fluid through the line 34 under action of the pump 35, the receptacle 10 will be partially full of fluid and partially full of air according to the degree of vacuum created by fluid passing through the venturi throat portion 28.

In response to a closing of the valve 37 downstream of the dampener 36, the kinetic flow energy of the fluid will suddenly be impeded with the result that pressure surge will tend to occur as the fluid tends to compress itself. At such time, the fluid in the line 34 will flow through the restricted openings 29 into the interior of the shell 10 to compress the gas disposed therein. Of course, as soon as the fluid flows into the shell 10 and the pressure is simultaneously increased, the vacuum breaker 14 will close. The compression of the gas will create in effect a pneumatic spring whereby the compression will continue until it equalizes the kinetic energy of the fluid; thereafter the fluid will tend to return to the line 34 by passing back through the openings 29 under the expansion forces of the gas and the effect of gravity. It will be appreciated that as the fluid passes back through the openings 29, in view of the tangential relationship of these openings to the interior of the throat section, a vortex will be created which will tend to absorb an additional amount of energy.

Certain design considerations must be considered in order that the pulsation dampening device of the present invention function adequately for a particular application. The first consideration is to ascertain the maximum pressure permissible. Thereafter, the openings 29 are designed to furnish a certain degree of restriction which will in turn create friction to fluid movement from the line 34 into the receptacle or shell 10 of the dampener 36. The actual friction resulting from forcing the fluid through the small openings 29 will absorb a part of the kinetic energy of the fluid; thereafter, more of the energy of the fluid will be absorbed in compressing the gas within the shell 10.

On reverse flow, the gases will be working to force the fluid back out of the openings 29; in consequence, vortex action is necessary as a further means of absorbing the energy of the fluid so that a reverse shock wave will not be created.

Of course, complete elimination of pressure increases is usually not necessary; however, with the device according to the present invention, it has been shown through actual installations that the increase in the pressure can be decreased ten fold by using the construction such as illustratively shown in the drawings.

It will also be appreciated that the vacuum breaker 14 is not essential, although it is desirable in certain applications for most effective elimination of pressure surges. Thus, for example, certain liquids will vaporize as a result of a sufficient pressure drop whereby the vapor created eliminates the necessity of external gas or air being drawn into the device. Further, under certain pressure conditions the bulk modulus of elasticity of the fluid compensates for the lack of the breaker. Thus, under low pressure conditions the bulk modulus of elasticity of most fluids decreases sufficiently to give the fluid itself a "spongy" characteristic.

A further advantage of the device according to the present invention is that substantially no maintenance is required and assuming the unit can use air for charging itself, no other gas or liquid connections need be made. The only moving element is embodied in the vacuum breaker which can be readily replaced if required.

It will be appreciated, however, that various changes and modifications may be made without departing from the spirit and scope of the invention as set forth in the claims which follow.

The present invention is a continuation-in-part of applicant's co-pending patent application Serial No. 144,456, filed October 11, 1961, and entitled Fluid Pulsation Dampener, and is also a continuation of applicant's co-pending patent application Serial No. 195,624 filed May 17, 1962, now abandoned.

What is claimed is:

1. A device for dampening surge pressures in a fluid line, said device comprising a closed receptable encircling and sealably connected to said line at two spaced points along the length thereof; a normally closed valve communicating between the interior of said receptacle and an external source of gas, said valve being designed to open in response to a given pressure drop within said receptacle; a venturi section interposed in said line, said venturi section defining a throat portion, and at least one opening in said throat portion communicating with the interior of said receptacle.

2. A device, according to claim 1, in which said opening communicates tangentially with said throat portion.

3. A device for dampening surge pressures in a fluid line, said device comprising a closed receptacle encircling and sealably connected to said line to enclose a given portion thereof between two spaced points along the length thereof; a normally closed valve communicating between the interior of said receptacle and an external source of gas, said valve being designed to open in response to a given pressure drop within said receptacle; a venturi section at least partially interposed in said given portion of said fluid line, said venturi section defining a throat portion and at least one opening in said throat portion communicating with the interior of said receptacle.

4. A device for dampening surge pressures in a fluid line, according to claim 3, in which said opening communicates tangentially with said throat portion and in which said receptacle is spherically shaped.

5. A device for interposition in a fluid line for dampening fluid surges therein comprising: a conduit having opposing ends designed for connection to corresponding ends of said line; a receptacle encircling and sealably connected to said conduit at two points, respectively, near the opposing ends of said conduit; a normally closed valve communicating between the interior of said receptacle and an external source of gas, said valve being designed to open in response to a given pressure drop within said receptacle; a venturi section interposed at least partially in said conduit, said venturi section defining a throat portion and at least one opening in said throat portion communicating with the interior of said receptacle.

6. A device for interposition in a fluid line, according to claim 5, in which said opening communicates tangentially with said throat section.

7. A device for dampening surge pressures in a vertically disposed fluid line, said device comprising a closed receptacle encircling and sealably connected to said line at two spaced points along the length thereof; a normally closed valve in the upper portion of said receptacle communicating between the interior of said vessel and an external source of gas, said valve being designed to open in response to a given pressure drop within said vessel, a venturi section interposed in said line, said venturi section defining a throat portion, and at least one opening in said throat portion communicating with the interior of the lower part of said receptacle.

8. A device for dampening surge pressures in a vertically disposed fluid line, according to claim 7, in which said opening communicates tangentially with said throat section.

9. A device for dampening surge pressures in a fluid line, said device comprising a closed receptacle encircling and sealably connected to said line at two spaced points along the length thereof; a venturi section interposed in said line, said venturi section defining a throat portion, and at least one opening in said throat portion communicating with the interior of said receptacle.

10. A device, according to claim 9, in which said opening communicates tangentially with said throat portion.

11. A device for dampening surge pressures in a fluid line, said device comprising a closed receptacle encircling and sealably connected to said line to enclose a given portion thereof between two spaced points along the length thereof; a venturi section at least partially interposed in said given portion of said fluid line, said venturi section defining a throat portion and at least one opening in said throat portion communicating with the interior of said receptacle.

12. A device for dampening surge pressures in a fluid line, according to claim 11, in which said opening communicates tangentially with said throat portion and in which said receptacle is spherically shaped.

13. A device for interposition in a fluid line for dampening fluid surges therein comprising: a conduit having opposing ends designed for connection to corresponding ends of said line; a receptacle encircling and sealably connected to said conduit at two points, respectively, near the opposing ends of said conduit; a venturi section interposed at least partially in said conduit, said venturi section defining a throat portion and at least one opening in said throat portion communicating with the interior of said receptacle.

14. A device for interposition in a fluid line, according to claim 13, in which said opening communicates tangentially with said throat section.

15. A device for dampening surge pressures in a vertically disposed fluid line, said device comprising a closed receptacle encircling and sealably connected to said line at two spaced points along the length thereof; a venturi section interposed in said line, said venturi section defining a throat portion, and at least one opening in said throat portion communicating with the interior of the lower part of said receptacle.

16. A device for dampening surge pressures in a vertically disposed fluid line, according to claim 15, in which said opening communicates tangentially with said throat section.

References Cited in the file of this patent

UNITED STATES PATENTS

| | | |
|---|---|---|
| 2,671,652 | McCullough | Mar. 9, 1954 |
| 2,896,862 | Bede | July 28, 1959 |
| 2,904,076 | Engel et al. | Sept. 15, 1959 |
| 3,018,799 | Volkmann et al. | Jan. 30, 1962 |